Nov. 18, 1924.  1,516,264
H. H. BLISS
DISPLAY
Filed Nov. 11, 1922    3 Sheets-Sheet 1
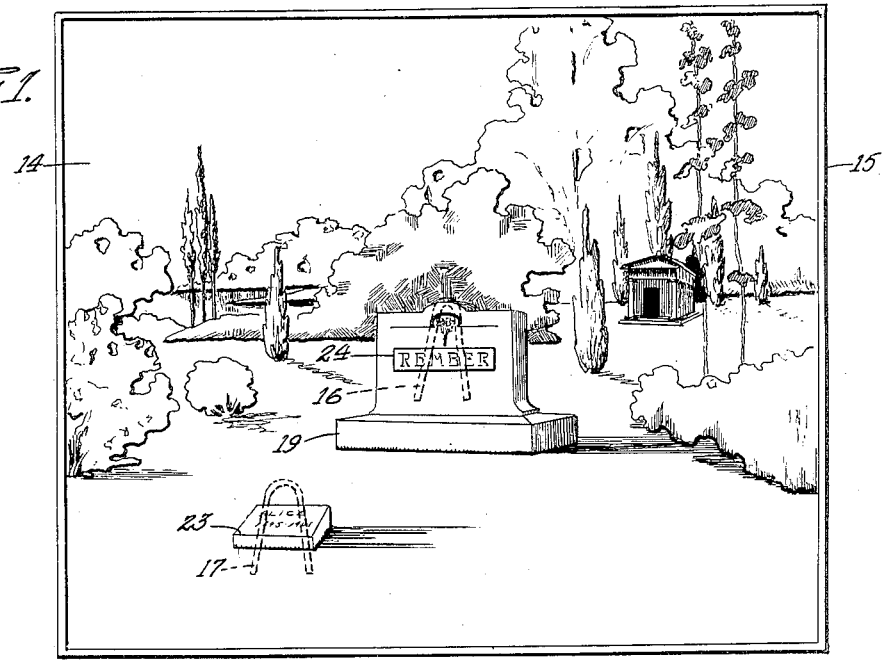
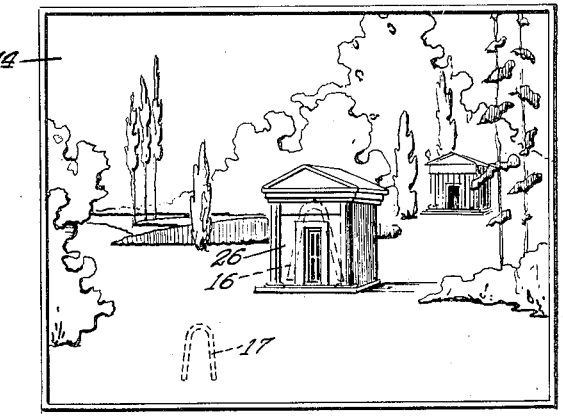
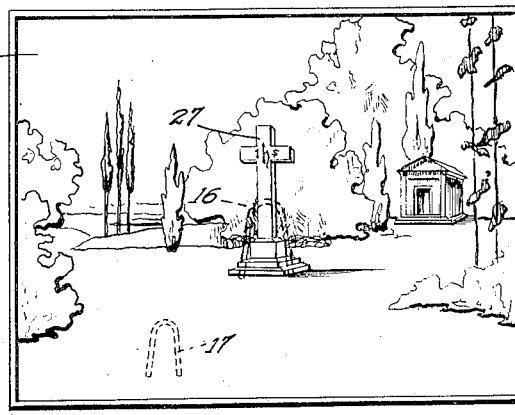

Nov. 18, 1924.
1,516,264
H. H. BLISS
DISPLAY
Filed Nov. 11, 1922  3 Sheets-Sheet 2
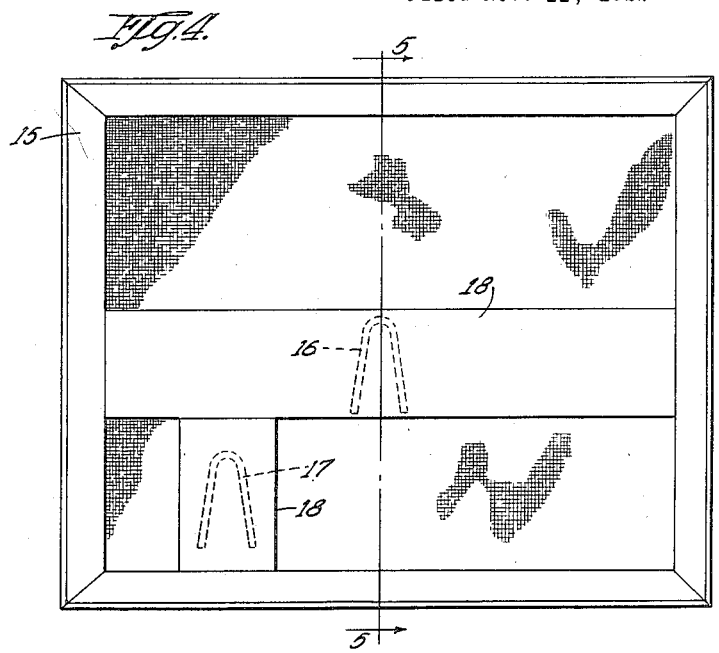
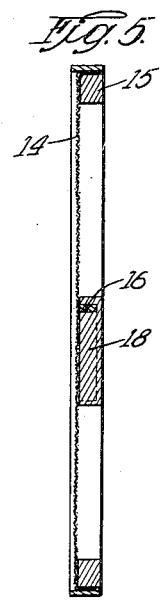
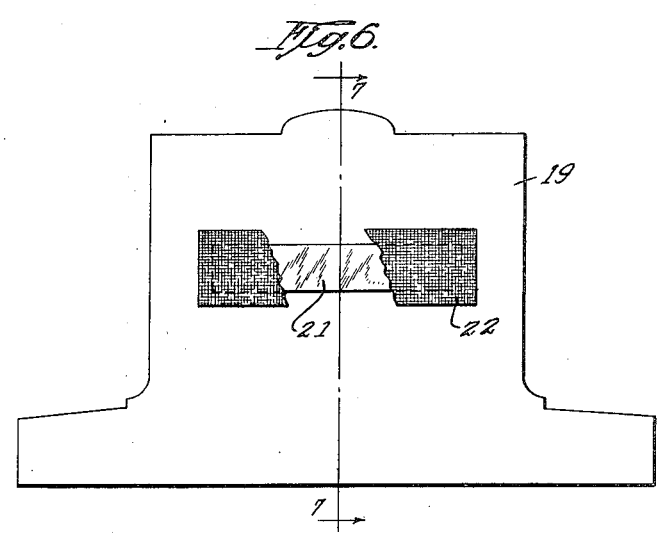
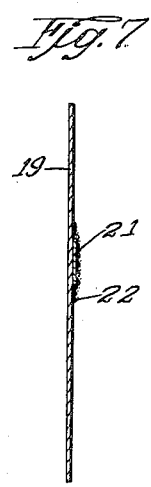
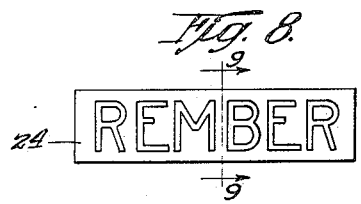
Inventor
Homer H. Bliss
by Wilson & McCanna
Attys.

Nov. 18, 1924.

H. H. BLISS

DISPLAY

Filed Nov. 11, 1922

Inventor:
Homer H. Bliss
By Wilson & McCanna
Attys.

Patented Nov. 18, 1924.

1,516,264

UNITED STATES PATENT OFFICE.

HOMER H. BLISS, OF ROCKFORD, ILLINOIS.

DISPLAY.

Application filed November 11, 1922. Serial No. 600,256.

*To all whom it may concern:*

Be it known that I, HOMER H. BLISS, a citizen of the United States, residing at Rockford, in the county of Winnebago and State of Illinois, have invented certain new and useful Improvements in Displays, of which the following is a specification.

This invention pertains in general to picture exhibiting, and more particularly to the displaying of pictorial or other representations of articles of manufacture, works of art and other objects, either natural or imaginary, for advertising, sales and other purposes.

One of the objects of my invention is to provide a novel means for displaying pictures or other representations of articles or objects of the character described. This object comprehends the visualizing by display means, of said articles or objects to better advantage and in a more realistic manner than has heretofore been practiced. That is, I have provided for the display of individual articles or objects of merchandise or otherwise, by means of pictorial or other representations or facsimiles thereof, supported on a holder, preferably containing a scenic or other pictorialization, with said article or object positioned in such relation to related parts on the picture as to realistically illustrate whatever merit, attractiveness, or other appeal it may possess.

My invention also contemplates the provision of display means of the character described comprising a pictorial back ground having means such as a magnet positioned behind the picture surface for attracting and holding a metal-equipped pictorial representation or facsimile of the article or object to be displayed, said holding means being adapted to support said object in any position to which the latter may be set or adjusted within an object-holding area and in any desired relationship to related parts on said picture back ground.

Other objects and attendant advantages will be appreciated by those skilled in this art as the invention becomes better understood by reference to the following description when considered in connection with the accompanying drawing, in which—

Figure 1 is a face view of a display embodying my invention;

Figs. 2 and 3 are similar views of said display on a reduced scale and showing objects of different designs supported on the picture back;

Fig. 4 is a rear view of the display or picture holder shown in Fig 1;

Fig. 5 is a sectional view taken on the line 5—5 of Fig. 4;

Fig. 6 is a rear view of the object supported on the picture back in Fig. 1;

Fig. 7 is a section taken on the line 7—7 of Fig. 6;

Fig. 8 is a face view of a supplemental object supported in connection with the principal object shown in Fig. 1;

Fig. 9 is a section taken on the line 9—9 of Fig. 8; and

Figure 10:
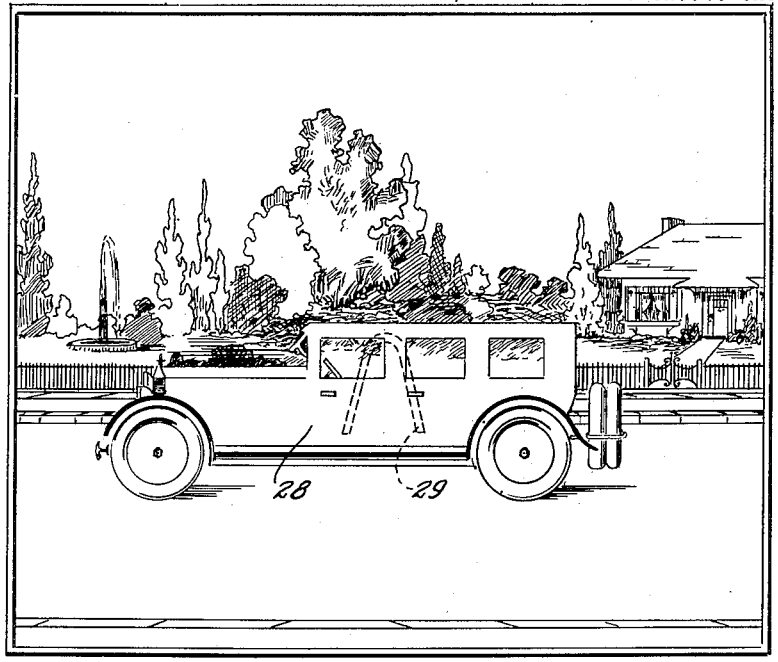
Figs. 10 and 11 are different examples of displays embodying my invention.

In the principal illustration of my invention, I have taken as an example the method of displaying monumental designs to prospective purchasers. The retailer of monuments, markers, mausoleums and the like, generally carries a stock of different designs, and when occasion requires special designs are obtained, usually from a designer of this class of work, to be submitted for consideration of the prospective purchaser. These designs are produced in various ways, such as by photographs, drawings, sketches, air brush work and paintings, or combinations of these. It is desired to display these monumental designs in an attractive and realistic manner, but these effects vary considerably, according to the nature of the production, that is, whether it is a photograph, drawing, or an original painting by an artist. Likewise, the cost of producing these different kinds of samples varies, making the high grade displays prohibitive for general use. By the present invention, however, I have advanced the art of displaying these monumental designs and other objects for advertising, sales and other purposes, to the end that such designs and objects may be more effectively displayed and at less cost than before, as will be presently more fully described.

In the instant example, my improvements comprise a scenic pictorial representation, preferably an oil painting by a capable artist, a variety of pictorial facsimiles or representations of different monumetal designs finished in natural color and of a size proportional to the objects within a given area on the picture, and means for holding any of said designs on the picture at a proper location within said area, thereby displaying the design in a most attractive and realistic manner. The design or object holding means is preferably in the form of a magnet supported behind the picture surface, and more than one of these holding means may be employed at different locations on the picture. The representation of the monumental design carries on its back a metal piece which when the design is positioned in proximity to the magnet will be attracted and held thereby. The design may be freely adjusted to the most advantageous location on the picture, and it will be manifest that the object-holding means is non-visible on the face of the picture. In this manner, any of a large number of structurally different monumental designs may be displayed in connection with a high grade picture back ground or setting.

Referring now more particularly to Figs. 1 to 5 of the drawings, it will be observed that the picture designated generally by 14, is in the present instance, a representation of an oil painting, supported on a suitable frame 15. One or more magnets are supported against the back of the picture at locations corresponding with such portions of the picture as are desirable for positioning of monuments, markers, and the like. Magnets 16 and 17 are employed in the present case, being set into and supported by suitable boards 18. The representation of the monument to be displayed will be produced on suitable flat material, cut to proper size, and finished in natural colors to resemble as closely as possible the actual monument. The object-representation 19 shown in Fig. 1, is in perspective and supported on the picture by the magnet 16. Said magnet attracts a metal plate 21, attached to the back of the object 19 by suitable means, such as a fabric cover 22, secured by adhesive to said object. It will be manifest that by reason of the foregoing construction, the object may be readily adjusted on the picture within an object-holding area defined by the limit of attraction of the magnet, and that said object as regards dimensions and proportions may be located on the picture in correct relation to the surrounding objects thereon, thus giving a true impression of the appearance of such object in actual use.

On the same picture an object-representation of a smaller monument, such for example as a marker 23, is supported closer to the front. This marker will be held on the picture by the magnet 17 mentioned above, the location of which defines an object-holding area located more in the fore-ground than that of the magnet 16. The marker 23 and likewise any object-representation will be equipped with a suitable metal part which will be attracted by the magnet.

A supplemental object may be supported on the principal object by the same magnet, an illustration being that of a name tablet 24 having a metal back piece 25, which obviously will be attracted by the magnet 16 and held in proper position on the monument 19, as shown in Fig. 1. By this means, the name plate may be used on any number of representations of monuments.

As a further illustration of displaying different monumental designs on the same picture ground, I have shown on Figs. 2 and 3, representations 26 and 27 of different monuments, each of which is equipped with a suitable metal piece, which is attracted by the magnet 16, thus holding the design in properly adjusted location on the picture.

Figure 11:

Other examples of my invention are shown in Figs. 10 and 11. In the former, the object to be displayed is the representation or pictorial facsimile of an article of manufacture such as an automobile 28. This object is equipped with a metal back piece and supported on the picture by a magnet 29. In this way, any of a series of automobile designs may be displayed on an appropriate back ground; and likewise any other article of manufacture or merchandise may be displayed on a picture back ground, providing a setting appropriate to the article.

Fig. 11 illustrates the application of my invention to the display of women's garments, and in this example the representation of the model and garment is combined in a single object 31 adapted to be supported on the picture by a magnet 32. By substituting new models and garments, an attractive window or counter display is provided.

From the foregoing, it will be manifest that my invention embraces the display of pictorial representations or facsimiles of innumerable objects for advertising, sales and other purposes, and that by supporting said objects on an appropriate and pictorial back ground by means non-visible from the face of the picture and in such manner as to permit ready adjustment of the object in the proper relation to other objects on the picture, a very effective and realistic display is obtained. It should be understood, therefore, that my invention is of broad application, and in no way limited to the particular examples disclosed herein for purpose of illustration.

I claim:

An advertising and sales device comprising profile pictorial facsimiles of articles of merchandise of a given class, a holder having a scenic pictorialization illustrating a realistic condition under which said articles are adapted to be used, the component parts of said pictorialization being proportional to those of said facsimiles, said holder having an article-holding area on the face of which any one of said facsimiles may be displayed in realistic and proportional relation to the surrounding component parts of the pictorialization, and holding means on said holder located only at said article-holding area and on said facsimiles only at the back thereof and adapted to become operative by the location of any selected facsimile in display position on the face of the holder for supporting said facsimile thereon and permitting adjustment of the facsimile at will to locate its component parts in any determined relation to those on said pictorialization.

HOMER H. BLISS.